2,954,214
Patented Sept. 27, 1960

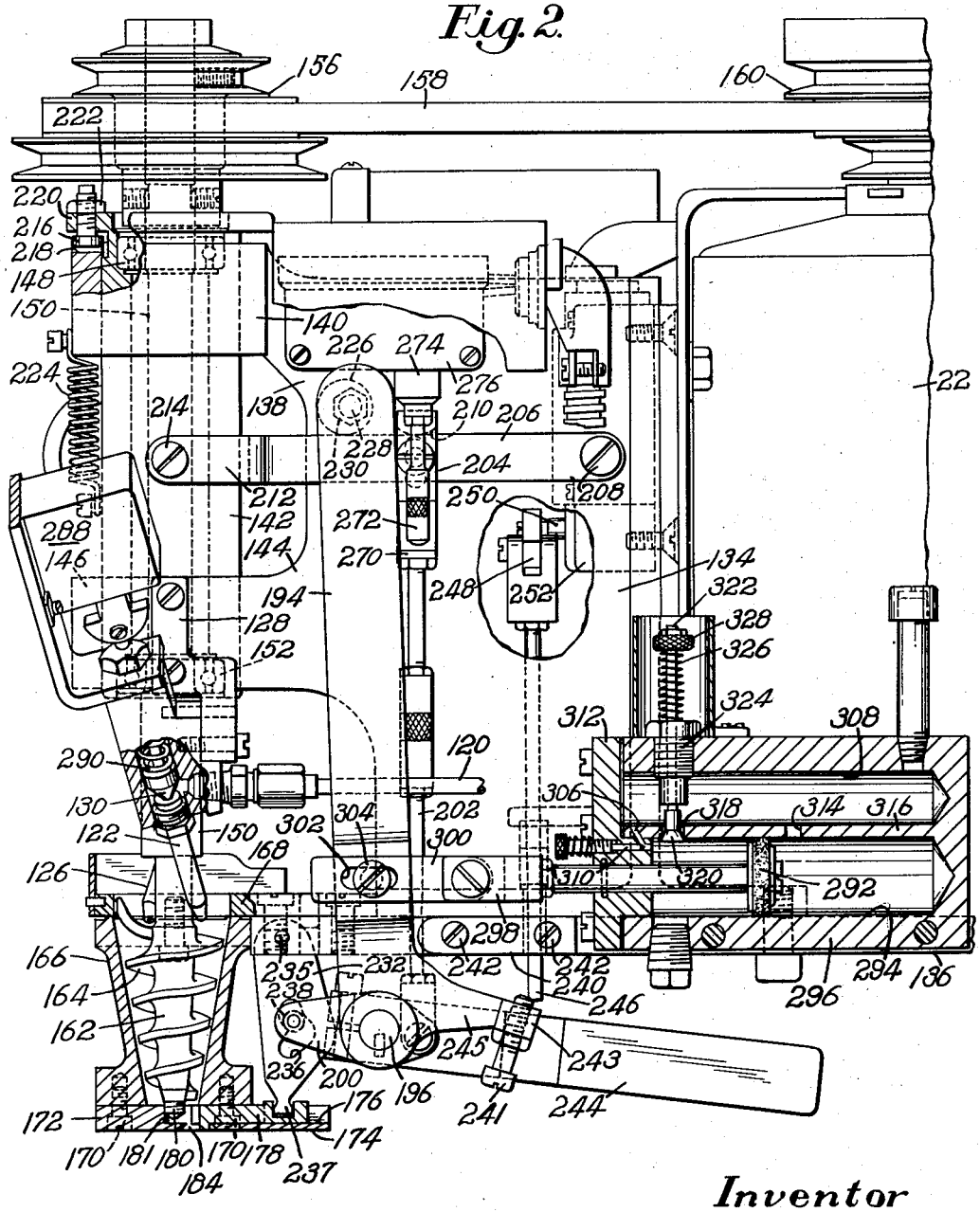

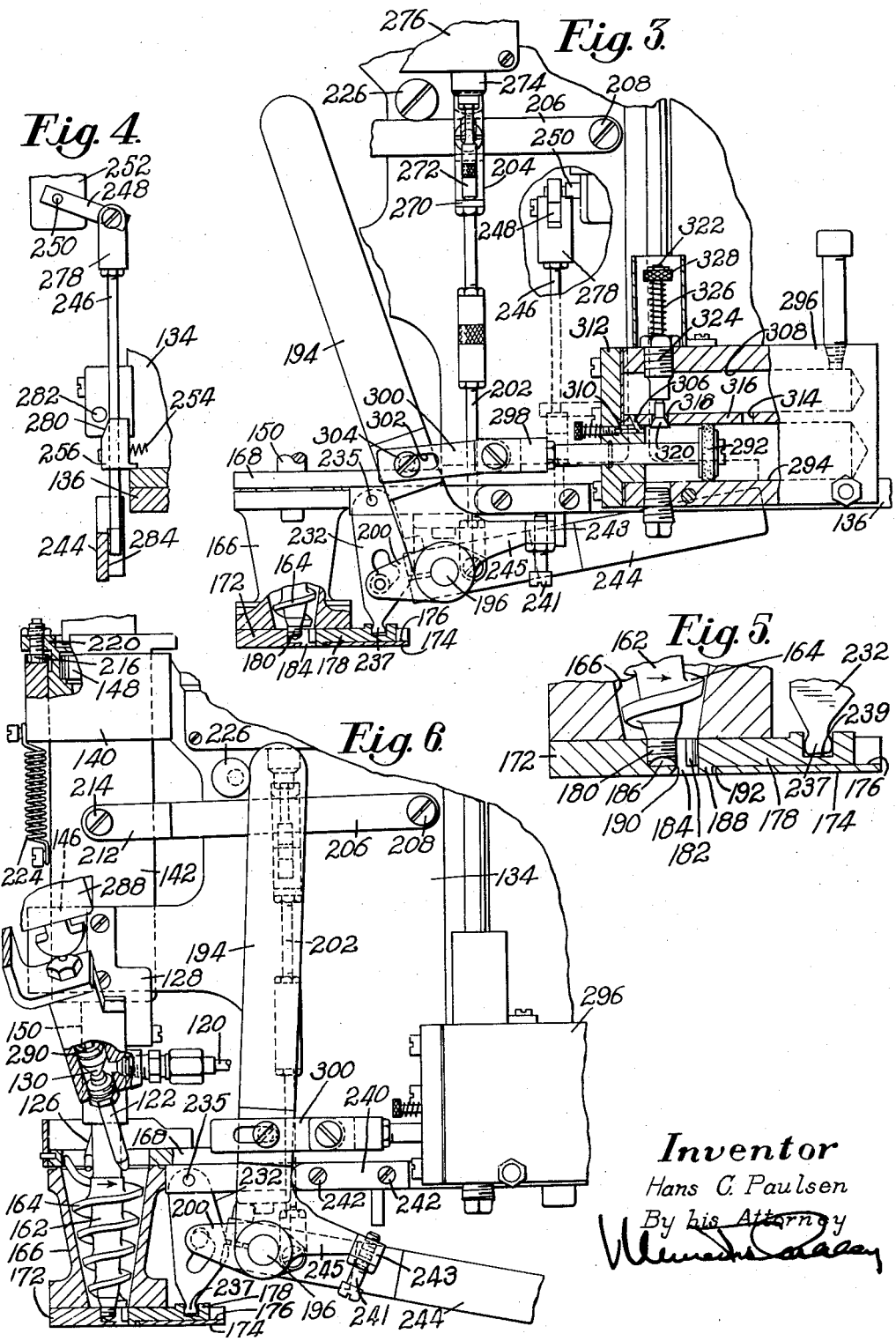

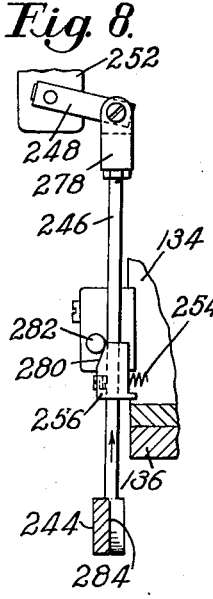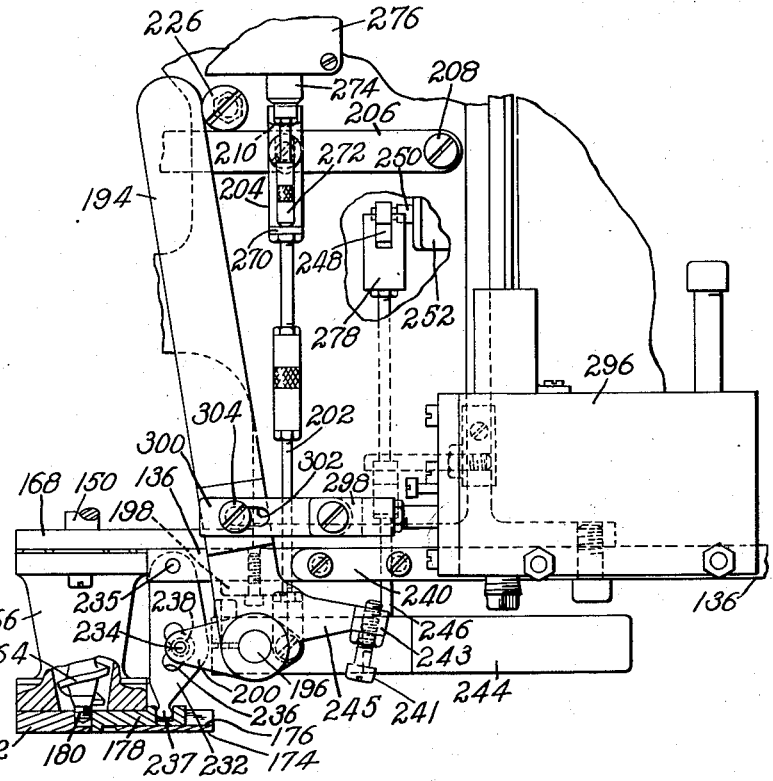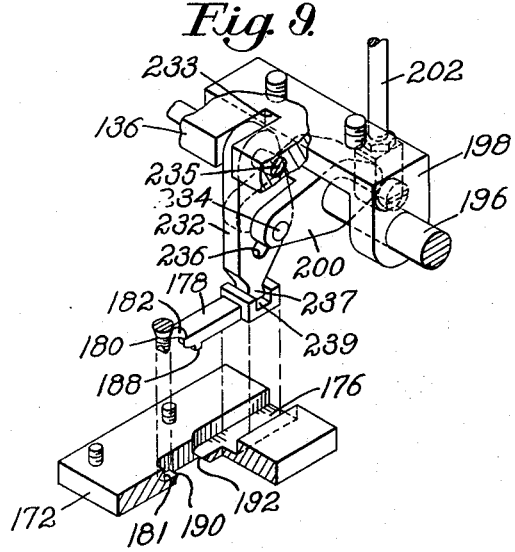

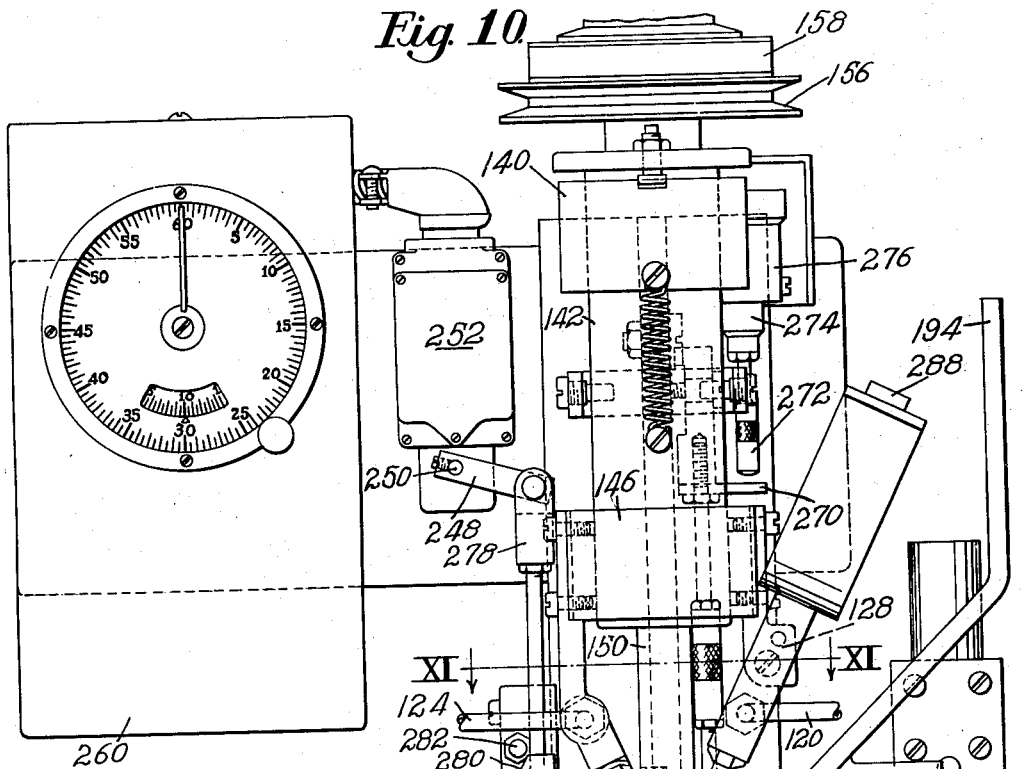
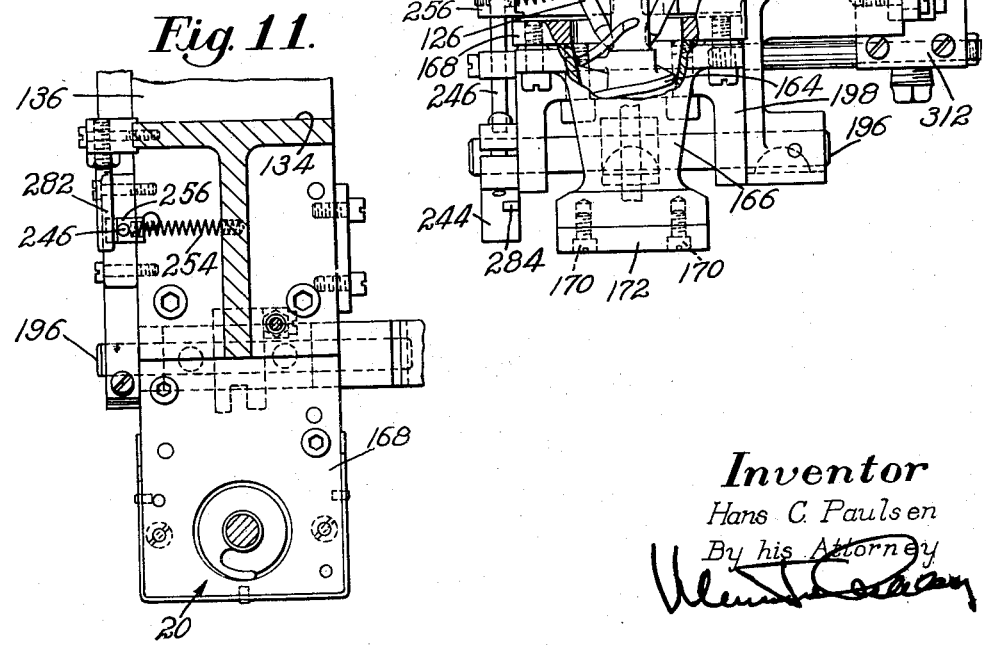

2,954,214

RESIN MIXING MACHINES

Hans C. Paulsen, Lexington, Mass., assignor to United Shoe Machinery Corporation, Boston, Mass., a corporation of New Jersey Filed May 27, 1957, Ser. No. 661,751

9 Claims. (Cl. 259—8)

This invention relates to mixing machines and devices, and is herein illustrated in its application to machines for producing viscous fluid mixtures such, for example, as polyurethane foams.

This application is a continuation-in-part of my copending application for United States Letters Patent Serial No. 601,184, filed July 31, 1956, now abandoned.

In machines and devices for producing viscous fluid mixtures, particularly mixtures of the type above referred to, it is desirable to make suitable provision for the clearance of residue from the mixing chamber while the residue is still in a fluid condition. This is particularly desirable in handling foaming mixtures which become adhesive as they solidify and in that state are difficult to remove from the surfaces to which they have become bonded.

It is an object of the present invention to provide in a mixing machine or device intended particularly for producing foaming mixtures suitable means for effecting the clearance of residue before it has solidified sufficiently to become bonded to the surfaces of the mixing chamber and maintaining a clear passage through the mixing chamber to the mold. With the above object in view the present invention in one aspect thereof consists in the combination of a frusto-conical mixing chamber having a discharge opening at its small end, a frusto-conical rotary mixer movable axially within the chamber between a position in which the mixer is substantially spaced from the chamber and a position in which it is in close proximity thereto. A gate is provided for closing the discharge opening of the chamber and in order to insure a clear passage through the discharge opening when the gate is open, a suitable clearing means co-operates with the gate to remove residue from the discharge opening, and to this end means is provided for effecting relative movement of the gate and the clearing means in a direction perpendicular to the axis of the mixer.

In the illustrated organization the mixer is provided with a threaded stem which operates as a scraper to clear residue from the gate when the mixing head is in its chamber clearing position. Fluid also adheres to the walls of the discharge opening of the mixing chamber and sometimes forms a semi-solid appendage thereon. In order to effect the removal of the appendage cooperating elements formed in the gate and the adjacent portions of the base of the chamber provide means for causing the appendage to be detached from the base of the mixing chamber. Preferably the cycle of clearing operations is performed after each mixing cycle in order that the surfaces of the chamber and the gate will be clear of fluid residue at the beginning of each mixing operation.

In order to provide for movement of the mixer between its mixing position and its chamber clearing position the illustrated machine is provided with a sleeve within which the mixer shaft rotates, suitable means being provided for holding the shaft against endwise movement relatively to the sleeve. Means is provided for moving the sleeve axially to transfer the mixer between a position in which it is in proximate space relation to the wall of the mixing chamber for the performance of the mixing operation and a position contiguous to the wall of the chamber for the performance of the clearing operation, suitable stops being provided for determining the two positions of the mixer.

In order to provide for the transmission of fluid to the mixing chamber, the invention contemplates the provision of a container and a pump for propelling fluid from the container to the mixing chamber. A manually operated actuator closes an electric circuit to initiate the operation of the pump and the same actuator also operates a member for opening the gate at the discharge port in the mixing chamber. A chronometer measures a period of operation of the pump and at the completion of the period of operation causes the operation of the pump to terminate. It will be understood that the period of operation of the pump is determined by the quantity of fluid required for filling the mold cavity and the measure of flow of fluid from the pump to the mixing chamber.

These and other features of the invention will now be described with reference to the accompanying drawings and pointed out in the appended claims.

In the drawings,

Fig. 2 is a right side elevation, partly in section, illustrating a mixing means;

Fig. 3 is a side elevation similar to Fig. 2 showing the parts at a different stage in the machine cycle;

Fig. 4 is a detail view in front elevation, partly in section, illustrating mechanism partly shown in Fig. 3;

Fig. 5 is an enlarged detail view, partly in section, in the plane of the axis of the mixing head, illustrating particularly the gate for enclosing the discharge opening at the base of the mixing chamber;

Fig. 6 is a right side elevation similar to Fig. 3 showing the mixing head in its chamber clearing position;

Fig. 7 is a right side elevaton similar to Fig. 6 showing the gate in its closed position;

Fig. 8 is a detail view similar to Fig. 4 showing the position of the parts at a stage in the machine cycle different from that shown in Fig. 4;

Fig. 9 is an exploded perspective view illustrating particularly the gate, its mounting means, and parts of its actuating mechanism;

Fig. 10 is a front elevation of the mixing organization, certain parts being broken away and shown in section in a plane common to the axis of the mixing head; and Fig. 11 is a section taken substantially on the line XI—XI of Fig. 10.

Figure 1:
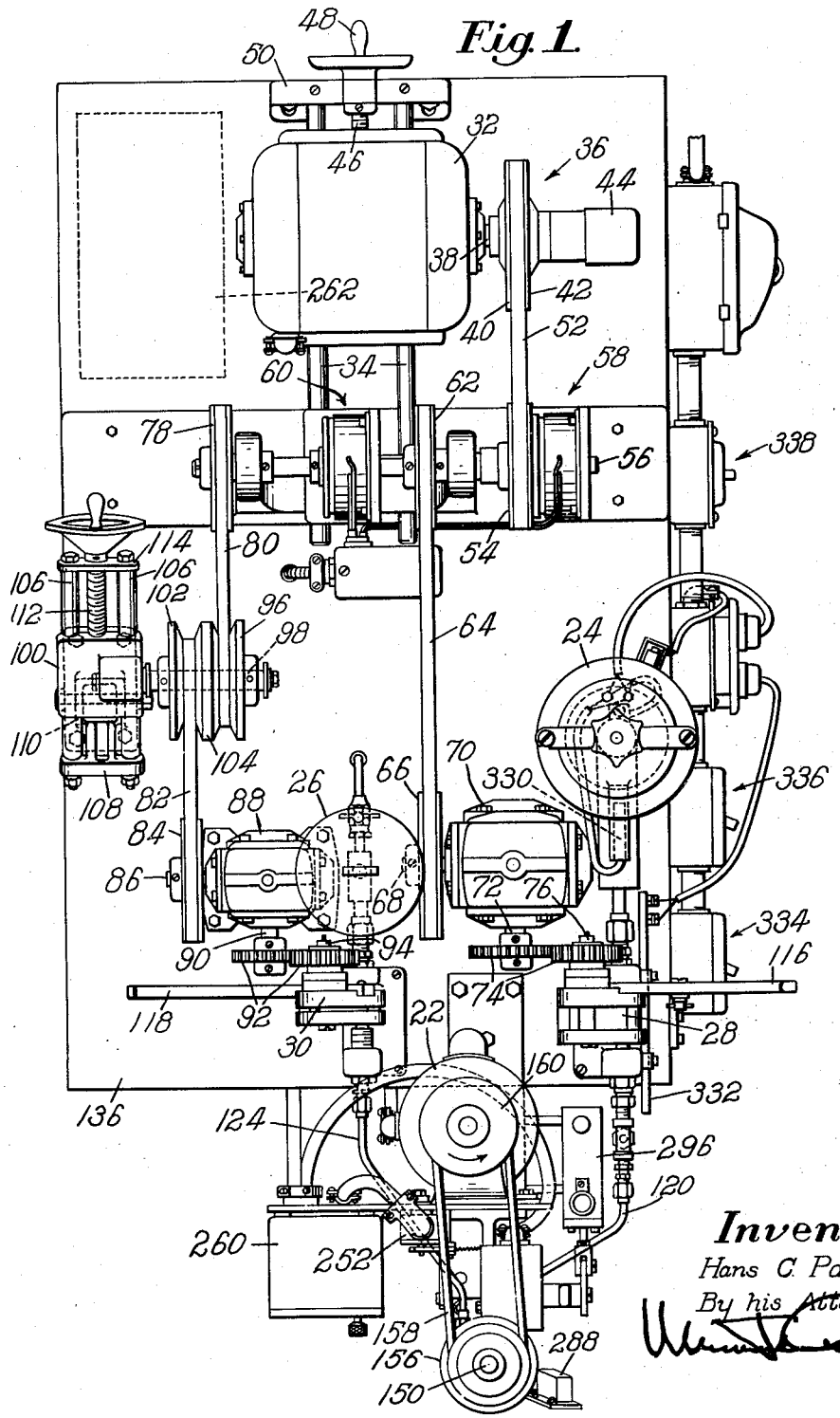
Fig. 1 is a plan view of an assembly embodying the features of the present invention.

The invention is illustrated in the drawings in its application to a combination of units which cooperate to mix two fluids such, for example, as a prepolymer and a catalyst which provide a foaming compound. As shown in Fig. 1, a rotary mixer operated by an electric motor 22 receives a fluid, for example, a prepolymer, from a container 24 and a second fluid, for example, a catalyst, from a container 26. Suitable gear pumps 28 and 30 are provided for transmitting to the mixer the prepolymer and the catalyst, respectively. The two pumps are actuated by an electric motor 32. In order to provide for volumetric control of the flow of fluid into a mixing chamber the motor 32 is mounted on parallel horizontal rails 34 for adjustive movement to vary the speed of operation of the pumps 28 and 30. This adjustment maintains constant the differential speed of the pumps and therefore does not alter the proportions of the fluids flowing into the mixing chamber. In the illustrated organization the adjustment of the motor 32 causes an automatic adjustment of the effective diameter of a variable speed pulley assembly 36 on the motor shaft 38. The illustrated pulley assembly, which is of the type illustrated, for example, in United States Letters Patent No. 2,140,942, granted December 20, 1938, on an application filed in the names of Reeves et al., comprises a disk 40 fixed to the motor shaft and a disk 42 slidably mounted endwise of the hub of the disk 40 and urged toward the disk 40 by a spring (not shown) enclosed by a suitable hub cap 44. For adjusting the motor 32 an adjusting screw 46 is threaded into suitable lugs (not shown) in the base of the motor and is provided with a hand crank 48 journaled in a suitable bearing in a standard 50 which also provides a mounting for the rails 34. The pulley 36 is connected by a V-belt 52 to a pulley 54 mounted to rotate freely on a countershaft 56. For operatively connecting the pulley 54 to the countershaft 56 an electromagnetic clutch 58 of known construction is arranged to cooperate with the pulley 54. The operation of the clutch is effected by the manual operation of a microswitch as hereinafter described. The operation of the microswitch also deenergizes an electromagnetic brake 60 in order to permit the countershaft to rotate. Fixed to the countershaft is a pulley 62 which is connected by a suitable belt 64 to a like pulley 66 fixed to an input shaft 68 of a gear reduction unit 70 having an output shaft 72 which is connected by change gears 74 to the power input shaft 76 of the gear pump 28. For operating the gear pump 30 a pulley 78 is fixed to the countershaft 56 and is connected by a suitable belt 80 to a pulley assembly, hereinafter described, which is connected by a belt 82 to a pulley 84 fixed to an input shaft 86 of a gear reduction unit 88. The output shaft 90 of the unit 88 is connected by suitable change gears 92 to the power input shaft 94 of the pump 30. The pulley assembly operated by the belt 80 comprises two frusto-conical disks 96 and 102 spaced apart from each other and fixed to a shaft 98 journaled in a sliding block 100, and a double frusto-conical disk 104 positioned between the disks 96 and 102 and slidably mounted on the shaft 98, the central portion of the disk 104 having tongue-and-groove connections with the disks 96 and 102, respectively. By adjusting the sliding block 100 forwardly or rearwardly, as the case may be, the effective diameters of the two pulley assemblies on the shaft 98 may be varied in order to adjust the ratio of the rotation of the countershaft 56 to the rotation of the power input shaft 94. The block 100 is mounted for sliding movement on parallel bars 106 fixed to a crosshead 108 which is hinged on a suitable fixture 110 in order to permit free swinging movement of the assembly vertically. The block 100 is adjusted endwise of the bars 106 by the operation of a hand screw 112 having threaded engagement in the block 100 and having its rear end portion journaled in a crosshead 114 connecting the rear ends of the bars 106.

If it is desired to interrupt the flow of fluid from the container 24 to the pump 28, a hand lever 116 is operated to swing the pump 28 in order to disconnect the change gears 74. Similarly, if it is desired to interrupt the flow of fluid from the container 26 to the pump 30, a hand lever 118 is operated to cause the change gears 92 to be disconnected. Fluid delivered by the pump 28 is conducted through a tube 120 to a nozzle 122 (Fig. 10) from which fluid is delivered into a mixing chamber or bowl 166. Fluid delivered by the pump 30 is conducted through a tube 124 to a nozzle 126 from which it is delivered into the mixing bowl. The nozzle 122 is attached to a fixed bracket 128 which is provided with a conduit through which the tube 120 communicates with the nozzle. In order to cause the flow of fluid from the nozzle 122 to be terminated concomitantly with the operation of the brake 60, a solenoid controlled valve 130 is mounted in the nozzle 122. If desired, a valve similar to the valve 130 may be provided for the nozzle 126 but it has been found that when the nozzle 126 is employed to deliver a thin fluid such, for example, as the usual catalyst employed to react a prepolymer, such a valve is not required because no substantial pressure is built up in the tube 124 and, consequently, the flow of fluid from the nozzle 126 terminates immediately upon the operation of the brake 60 to arrest the operation of the pump 30.

For mounting a mixing means hereinafter described, a standard 134 (Fig. 2) is arranged to extend upwardly from a table 136. The standard has an upper extension 138 which terminates in a tubular head 140 which provides a mounting for the upper end portion of a sleeve 142. A lower extension 144 of the standard 134 terminates in a tubular head 146 substantially identical in construction to the head 140 and arranged coaxially therewith. The sleeve 142 is slidably mounted for vertical movement in the heads 140 and 146 by manually operated means hereinafter described. Mounted in a counterbore in the upper portion of the sleeve is a ball bearing 148 for a shaft 150 and mounted in a counterbore in the lower portion of the sleeve is a similar ball bearing 152. The shaft 150 fits tightly in the inner races of the two ball bearings which thus prevent vertical movement of the shaft relatively to the sleeve 142. Fixed to the lower end portion of the shaft 150 is a frusto-conical mixing head of the auger type, and fixed to the upper end portion of the shaft 150 is a cone pulley 156 which is connected by a belt 158 to a similar cone pulley 160 on the shaft of the motor 22. The illustrated mixing head comprises a downwardly tapering hub 162 having formed integrally therewith a helical tongue 164 the edge face of which is common to the frustum of a cone. The upper end portion of the tongue 164 is curved upwardly to locate its extremity substantially at the top of the mixing bowl. The mixing head operates in the bowl 166 having the same apex angle as the frustum defined by the edge face of the tongue 164. The bowl is arranged in coaxial relation to the mixing head and is secured to a horizontal platform 168 fixed to and extending forwardly from the table 136. The platform is provided with a circular opening coaxial with the wall of the mixing bowl 166. Secured to the enlarged bottom portion of the mixing bowl by headed screws 170 is a base plate 172 having an extension 174 in which is formed a groove 176 which provides a guideway for a sliding gate 178. The groove 176 is extended to the left, as seen in Fig. 2, to bring its end portion into alinement with the hub 162 of the mixer, and the hub has a threaded stem 180 which extends downwardly into the end portion of the groove and serves as a scraper for eliminating any residue of fluid that may accumulate in the left end portion of the groove in the operation of the mixer. Referring to Fig. 9, the left end portion of the groove 176 is reduced to a width corresponding to the diameter of the scraper stem 180 of the mixer, and the left extremity 181 of the groove is made semicircular so that the wall of the groove is disposed in contiguous relation to the stem. Similarly, the left end of the sliding gate 178 has formed therein a semicircular recess 182 the wall of which is in contiguous relation to the scraper stem 180 when the gate is at the limit of its closing movement. Movement of the gate 178 to the right into its position illustrated in Fig. 2 opens a discharge port 184 (Fig. 2) formed in the base plate 172 and offset to the right from the scraper stem 180.

In order to provide for the clearing of fluid residue from the mixing bowl 166, the left end portion 181 of the groove 176 and the recess 182 in the gate 178, the mixer is movable axially from its mixing position, illustrated in Fig. 2, downwardly into its bowl clearing position, illustrated in Fig. 6. In its mixing position, illustrated in Fig. 2, the mixer is located in accurately predetermined relation to the wall of the mixing bowl with the edge face of the tongue 164 spaced to a measured extent from the wall of the mixing bowl in order to enable the mixer to cause the shearing action and turbulence in the fluid contents of the bowl required for the intermixing of the two fluids therein. In its bowl clearing position, illustrated in Fig. 6, the mixer is at the limit of its downward movement with the edge face of tongue 164 in close proximity to the wall of the bowl 166, being separated therefrom only to the extent required to obviate actual metal to metal contact of the tongue with the bowl. When the mixer is in its bowl clearing position, the scraper stem 180 (Fig. 5) is seated in the end portion of the groove 176 with its wedge-shaped extremity 186 substantially in contact with the base of the groove in order to effect a complete clearing of any fluid residue from the end portion of the groove. It frequently happens that after the completion of the clearing operation by the mixer a semi-solid residue depends from the bottom of the base plate 172, adhering to the walls of the discharge port 184. In order to weaken the adhesive attachment of the depending residue to the base plate sufficiently to cause it to be detached by gravity, a chopping action is exerted thereon by the sliding gate 178. To this end, the left end portion of the gate has a downward extension or boss 188 which, upon movement of the gate to the left, acts against a rectilinear cutting edge 190 formed in the base plate 172. Upon movement of the gate to the right the boss 188 acts against a rectilinear cutting edge 192. The cutting edge 190 forms the left extremity of the discharge port 184 and the wall of the recess 182 in the gate 178 forms the right extremity.

Referring to Fig. 2, the vertical movement of the mixer between its mixing position and its bowl clearing position is effected by the operation of a hand lever 194 fixed to a shaft 196 journaled in a yoke 198 (Fig. 9) secured to and depending from the table 136. Also fixed to the shaft 196 is a short rocker arm 200 the rear portion of which is pivotally connected to the lower extremity of a link 202 the upper end portion of which has fixed thereto a vertically elongate head 204 (Fig. 2) having a longitudinal opening through which extends a horizontal lever 206 pivoted at its right end on a headed screw 208 fixed in the standard 134. The upper end wall 210 of the opening in the head 204 is made convexly arcuate for bearing engagement with the upper edge face of the lever 206. At its left end the lever 206 terminates in an arcuate yoke 212 which has fixed therein headed screws 214 which are pivoted in opposite sides of the sleeve 142. Movement of the hand lever 194 in a clockwise direction, as seen in Fig. 2, causes downward movement of the link 202 and downward swinging movement of the lever 206. Such downward movement of the lever causes downward movement of the entire mixing assembly comprising the sleeve 142, the shaft 150 journaled in bearings in the sleeve, and the mixing head secured to the lower extremity of the shaft 150. The downward movement of the mixing assembly is arrested by the engagement of a stop screw 216 with the base of a notch 218 formed in the tubular head 140 in which the sleeve is slidably mounted. The stop screw 216 is adjustably mounted in a lug 220 projecting forwardly from the upper extremity of the sleeve 142 and is secured in adjusted position by a lock nut 222. A spring 224 normally holds the mixing assembly at the limit of its upward movement with the mixing head in its mixing position, as shown in Fig. 2. This position of the mixer is determined by the engagement of the lever 206 with the edge face of a disk 226 having an eccentric stem 228 mounted to rotate in a bore in the web portion of the standard 134 and having on its threaded end portion a clamping nut 230 for securing the disk 226 in adjusted position. It will be seen that the adjustment of the disk 226 adjusts the vertical position of the mixing head relatively to the bowl 166 and thus adjusts the space relation between the edge face of the tongue 164 and the wall of the mixing bowl. Such adjustment of the mixing head varies the shearing action and the turbulence caused by the rotation of the mixer in accordance with the specific requirements of the fluids to be mixed.

For operating the gate 178 the rocker arm 200 is arranged to actuate a lever 232. Referring to Fig. 9, the upper end portion of the lever 232 is positioned in a notch 233 formed in the forward end portion of the table 136 and is pivotally mounted on a pin 235 fixed in the table. The lower end portion of the lever 232 is tapered and has formed therein a head 237 which operates in a notch 239 formed in the enlarged right end portion of the slide 178. The central portion of the lever 232 is positioned in the bifurcated forward portion of the rocker arm 200 which carries a crosspin 234 extending through a cam slot 236 formed in the lever 232. It will be seen that the operation of the hand lever 194 in a clockwise direction, as seen in Fig. 7, imparts upward movement to a cam roll 238 on the crosspin 234 thereby swinging the lever 232 in a counterclockwise direction and causing rearward movement of the gate 178 concomitantly with the downward movement of the mixing head into its bowl clearing position. Such movement of the gate 178 brings the boss 188 into engagement with the cutting edge 192 formed in the base plate 172. In order to prevent undue pressure of the boss 188 against the cutting edge 192 a stop member, herein illustrated as a plate 240, is arranged to be engaged by the rear edge face of the hand lever 194 to arrest its clockwise movement.

The hand lever 194 is swung in a counterclockwise direction, as seen in Fig. 2, to move the gate 178 rearwardly into its position illustrated in Fig. 3 and to start the pumps 28 and 30 thereby to cause the flow of fluid into the mixing bowl. Such movement of the gate 178 is arrested by the engagement of a stop screw 241 with the bottom surface of the table 136. The stop screw is adjustably mounted in a head 243 at the end of an arm 245 projecting rearwardly from the hub of the hand lever 194. The provision of the adjustable stop screw 241 permits the adjustment of the size of the discharge opening 184 at the base of the mixing bowl 166. The adjustment of the discharge opening will vary in proportion to the viscosity of the fluids to be mixed, the adjustment being such that the fluids are retained within the mixing bowl only as long as necessary to effect a complete mixture thereof.

In order to provide for the initiation of the operation of the pumps 28 and 30 by the hand lever 194, the link 202 has an arm 270 extending laterally to the right, as seen in Fig. 10, and arranged to engage the head of a stem 272 mounted in a bearing 274 extending downwardly from a switch box 276. The upward movement of the stem 272 by the arm 270 operates a microswitch (not shown) mounted in the box 276. The microswitch closes a circuit through a transformer (not shown) in a control box 262 (Fig. 1) to a suitable relay (not shown) which operates to close an electrical circuit to the electromagnetic clutch 58. The operation of the clutch 58 connects the motor 32 to the pumps 28 and 30 through mechanism hereinbefore described. The operation of the microswitch also causes a relay in the control box 262 to disengage the brake 60, concomitantly with the engagement of the clutch 58, in order to permit the operation of the countershaft 56. The operation of the pumps continues during an interval determined by the setting of a chronometer 260 (Fig. 10), the operation of which is initiated by mechanism hereinafter described. After the indicated time has elapsed the chronometer causes the closing of an electrical circuit through the transformer in the control box 262 to suitable relays whereby the electrical circuit to the clutch 58 is opened while the electrical circuit to the brake 60 is closed in order to arrest the rotation of the countershaft 56 and thus to terminate the operation of the pumps 28 and 30. The motor 32 then operates idly until the hand lever 194 is again operated to initiate the mixing cycle. For initiating the operation of the chronometer an arm 244 (Fig. 10) is fixed to the shaft 196 and arranged to bear against the lower end portion of a rod 246 the upper end of which carries a yoke 278 which is pivotally mounted on a short arm 248 fixed to a shaft 250 in the lower portion of a box 252. The lower end of the rod 246 is normally held in registration with the arm 244 by a spring 254 (Fig. 11) one end of which is mounted in a socket in a block 256 fixed to the rod 246 and the other end of which is mounted in a socket formed in the web portion of the standard 134. The upward movement of the rod 246 by the operation of the hand lever 194 swings the arm 248 in a counterclockwise direction, as seen in Fig. 10, thereby to close a circuit through which an electrical impulse is transmitted to the chronometer 260 to initiate its operation. Continued upward movement of the arm 248 after the chronometer has started brings a cam surface 280 (Fig. 8) formed in the block 256 into engagement with a fixed pin 282 thereby to move the rod 246 laterally into alinement with a notch 284 formed in the arm 244, thus permitting the rod to be moved by gravity into its position shown in Fig. 4 thereby swinging the arm 248 in a clockwise direction to open the circuit to the chronometer. The downward movement of the rod is arrested by the engagement of the block 256 with the base portion of the standard 134.

Concomitantly with the operation of the brake 60 to arrest the operation of the pumps the valve 130 is operated to close the nozzle 122 in order to prevent continued flow or drip of fluid therefrom. The operation of the valve is effected by a spring 290 upon the de-energization of a solenoid 288 which holds the valve 130 open. The solenoid is de-energized by the operation of a relay (not shown) in the control box 262 effected by the chronometer 260 upon the completion of the time cycle. The solenoid is re-energized to open the valve 130 upon the closing of the microswitch in the switch box 276 by the operation of the hand lever 194.

In order to insure a sufficient mixing of the fluids in the bowl 166 before the discharge port 184 is opened, means is provided for controlling or retarding the movement of the gate 178 by the hand lever 194 into its position shown in Fig. 3. Referring to Fig. 2, the illustrated retarding means comprises a governor illustrated in the drawings as a piston 292 mounted in a cylinder 294 formed in a block 296 secured to the table 136. Secured to the piston rod is a yoke 298 in which is pivotally mounted a link 300. In the free end portion of the link is a longitudinal slot 302 through which extends a headed screw 304 mounted in the hand lever 194. When the machine is in its rest postion illustrated in Fig. 2 the screw 304 is positioned between the ends of the slot 302 and the discharge port 184 is open. During the counterclockwise movement of the hand lever from its position in Fig. 2 to its position in Fig. 7 the gate 178 moves to the left, as seen in Fig. 7, to close the discharge port and the screw 304 advances to the end of the slot 302. Continued counterclockwise movement of the hand lever 194 from its position illustrated in Fig. 3 into its position illustrated in Fig. 3 moves the gate 178 to the right to open the discharge port 184. The latter movement of the hand lever is retarded by the piston 292. Such movement of the hand lever causes the piston to move a body of fluid in the cylinder 294 through a port 306 connecting the cylinder 294 to an upper cylinder 308 formed in the block 296. The passage of fluid through the port 306 is regulated by an adjustable needle valve 310 mounted in an end plate 312 secured to the block 296. Fluid passes freely between the upper cylinder 308 and the rear portion of the lower cylinder 294 through a port 314 in the partition 316 separating the two cylinders. During its return the piston 292 moves to the right from its position in Fig. 3 to its position in Fig. 2 without retarding the movement of the hand lever. During such return movement of the piston the fluid in the rear portion of the cylinder 294 moves upwardly through the port 314 into the upper cylinder 308 and displaces fluid in the upper cylinder through a port 318 in the partition 316 into the forward portion of the cylinder 294. The port 318 is normally closed by a poppet valve 320 but is opened by relatively light downward pressure to permit the flow of fluid from the upper cylinder into the lower cylinder while maintaining the port 318 permanently closed to the flow of fluid from the forward portion of the cylinder 294 through the port 318 into the upper cylinder. The poppet valve 320 has an elongate stem 322 slidably mounted in an axial bore in an elongate screw plug 324 mounted in the upper wall of the block 296. The poppet valve is normally closed by a relatively light spring 326 surrounding the stem 322 and confined between the screw plug 324 and a knurled nut 328 on the threaded upper end portion of the stem 322.

If desired, suitable heating means such, for example, as electric heating elements may be provided for heating the fluid in the container 24 (Fig. 1) in order to maintain the viscosity of the fluid at a degree permitting the fluid to flow freely through the pump 28 and the tube 120 to the mixing bowl 166. In Fig. 1 one heating element for the container 24 is identified by the numeral 330. A heating element 332 maintains the temperature of the fluid in the pump 28.

In the operation of the illustrated machine the motor 22 which operates the mixer is started by closing a switch 334 (Fig. 1). In the illustrated organization the mixer operates continuously until one or the other of the containers 24 and 26 has been emptied and the mixing bowl has been cleared of any residue remaining therein or, alternatively, until all of the molds in a given batch have been filled. The motor 32 which actuates the pumps 28 and 30 is started by closing a switch 336. The motor 32 also operates continuously. A switch 338, located in the line between the control box 262 and the clutch 58 and the brake 60, is closed to permit the operation of the electromagnets which actuate the clutch and the brake. The position of the motor 32 having been adjusted to regulate the combined input into the mixing bowl 166 from the nozzles 122 and 126, and the slide block 100 having been adjusted as required to regulate the ratio of the output of the pump 30 to the output of the pump 28, the hand lever 194 is operated to initiate the mixing operation. It will be remembered that the mixer at this time is in its elevated position, this position being determined by the engagement of the lever 206 with the eccentric disk 226 which was previously adjusted to determine accurately the mixing position of the mixing head in the bowl 166. During the movement of the hand lever from its position in Fig. 2 to its position illustrated in Fig. 7 the gate 178 is moved to the left to close the discharge port 184. Also, during this stage in the operation of the hand lever the arm 270 at the upper end of the link 202 moves upwardly closing the space between the arm and the stem 272 and then operating the microswitch. The operation of the microswitch occurs just prior to the completion of the closing movement of the gate 178 thereby disengaging the brake 60 and causing the engagement of the clutch 58 to initiate the operation of the pumps 28 and 30. The operation of the microswitch also energizes the solenoid 288 to open the nozzle valve 130. The mixer being in continuous operation, the mixing of the fluids begins immediately upon the flow of fluids from the nozzles into the mixing bowl. The operation of hand lever 194 in a counterclockwise direction, as seen in Fig. 2, continues during the early part of the mixing operation. A thorough mixing of the fluids prior to the initial discharge of the mixture through the port 184 is insured by the retarding of the operation of the hand lever by the piston 292 thereby controlling the operation of the gate 178. As the fluids begin to flow from the nozzles 122 and 126 the operation of the arm 244 by the hand lever 194 causes the arm 248 (Fig. 8) associated with the control box 252 to initiate the operation of the chronometer 260. The mixer operates for the duration of a time cycle determined by the adjustment of the chronometer. At the end of the cycle the chronometer closes a circuit which causes the operation of relays in the control box 262 whereby the clutch 58 is disengaged and the brake 60 is engaged to arrest the operation of the pumps 28 and 30. The operation of the chronometer also causes the solenoid 288 to be de-energized to permit the spring 290 to close the nozzle valve 130.

After each mixing operation the hand lever 194 is swung in a clockwise direction from its position in Fig. 2 into its position illustrated in Fig. 6, thereby to move the mixing head downwardly into its bowl clearing position in order to cause the bowl to be thoroughly cleared of any fluid residue adhering thereto. Such operation of the hand lever moves the stem 180 downwardly into its position best shown in Fig. 5 in order to clear fluid residue from the left end portion of the groove 176. In the course of the downward movement of the mixing head into its bowl clearing position, the gate 178 is advanced to bring its arcuate end face 182 into contiguous relation to the stem 180 in order to cause any fluid residue on said arcuate end face to be cleared therefrom. The operation of the gate also causes the boss 188 formed therein to cooperate with the cutting edges 190 and 192 to clear the discharge port 184 of fluid residue adhering to the surfaces adjacent to the discharge port. While the boss 188 is not effective to remove fluid residue from the bottom surfaces of the base plate 172 adjacent to the discharge port 184, it weakens the adhesive attachment of the semi-solid residue depending from the base plate sufficiently to cause such depending residue to drop from the base plate into the mold. In order to insure the detachment of such depending residue from the base plate, the gate 178 reciprocates twice between the cutting edges 190 and 192 in the course of the clearing operation, first, during the movement of the hand lever from its position in Fig. 2 into its position in Fig. 6, and thereafter during the return movement of the hand lever to its rest position in Fig. 2. The return movement of the hand lever elevates the mixing head into its position illustrated in Fig. 2, leaving the bowl 166 and the surfaces adjacent to the discharge port 184 entirely clear of fluid residue and ready for the next succeeding mixing operation.

Having thus described my invention, what I claim as new and desire to secure by Letters Patent of the United States is:

1. In combination, a frusto-conical mixing chamber having a discharge opening at its small end, a frusto-conical mixer constructed and arranged to operate in the mixing chamber, a shaft on which the mixer is mounted, a sleeve within which the shaft rotates, means for holding the shaft against endwise movement relatively to the sleeve, means for moving the sleeve axially in one direction to locate the mixer in predetermined and proximate space relation to the wall of the mixing chamber for the performance of a mixing operation and in the opposite direction to locate the mixer relatively to the chamber for the performance of a chamber clearing operation, a first stop member for determining the position of the sleeve with the mixer in its mixing position, and a second stop member for determining the position of the sleeve with the mixer in its chamber clearing position.

2. In combination, a frusto-conical mixing chamber having a discharge opening, a frusto-conical mixing rotor movable axially within the chamber between a position in which the rotor is substantially spaced from the chamber and a position in which it is in close proximity thereto, a gate for closing the discharge opening, means for clearing surfaces adjacent to the discharge opening, and means for effecting relative movement of the gate and the clearing means in a direction perpendicular to the axis of the rotor.

3. In combination, a mixing chamber having a discharge port, a gate for closing the discharge port, means for moving the gate in a plane perpendicular to the axis of the discharge port to and from closing position, a mixer constructed and arranged to operate in the chamber, and a helically threaded member extending from the mixer and operable by physical contact with the gate to clear residue therefrom.

4. In combination, a mixing chamber having a discharge port formed therein, a mixing rotor movable axially within the chamber between a mixing position and a chamber clearing position, a gate for closing the discharge port, means for clearing surfaces of the gate and the chamber adjacent to the discharge port, an actuator for effecting relative movement of the gate and the clearing means, and means operated by the actuator for imparting axial movement to the mixing rotor.

5. In combination, a mixing chamber having a discharge port formed therein, a mixing rotor movable axially within the chamber between a mixing position and a chamber clearing position, a gate for closing the discharge port, means for clearing surfaces of the gate and the mixing chamber adjacent to the discharge port, an actuator for effecting relative movement of the gate and the clearing means in a plane perpendicular to the axis of the rotor, and means operated by the actuator for effecting axial movement of the mixing rotor.

6. In combination, a mixing chamber having a discharge port, a mixing rotor constructed and arranged to operate in the chamber, a gate for closing the discharge port, a container from which fluid is transmitted to the chamber, a pump for propelling fluid from the container to the chamber, means operated by the closing of an electric circuit to transmit motive power to the pump, means for closing said electric circuit to start the operation of the pump, a manually operated actuator, a first member operated by the actuator for causing the operation of said circuit closing means, a second member operated by the actuator for operating the gate, a chronometer for measuring a determinate period of operation of the pump, and means rendered effective by the chronometer upon the completion of the period of operation of the pump for causing its operation to terminate.

7. In combination, a mixing chamber having a discharge port, a mixing rotor constructed and arranged to operate in the chamber, a gate for closing the discharge port, a container, a pump for propelling fluid from the container to the chamber, means operated by the closing of an electric circuit to transmit motive power to the pump, means for closing said electric circuit to start the operation of the pump, a manually operated actuator, a first member operated by the actuator for causing the operation of said circuit closing means, a second member operated by the actuator for operating the gate, a chronometer for measuring a determinate period of operation of the pump, and means rendered effective by the chronometer upon the completion of the period of operation of the pump for causing its operation to terminate.

8. In combination, a mixing chamber having a discharge port, a mixing rotor movable axially within the chamber between a mixing position and a chamber clearing position, a gate for closing the discharge port, an actuator for moving the gate in a plane perpendicular to the axis of the rotor to and from closing position, and means operated by the actuator for advancing the rotor from its mixing position to its chamber clearing position.

9. In combination, a mixing chamber having a discharge port, a mixing rotor movable axially within the chamber between a mixing position and a chamber clearing position, a gate for closing the discharge port, means on the gate for clearing fluid residue from the discharge port, an actuator for moving the rotor from its mixing position to its chamber clearing position, and means operated by the actuator for reciprocating the gate to effect the clearance of residue from the discharge port.

References Cited in the file of this patent

UNITED STATES PATENTS

| | | |
|---|---|---|
| 1,101,199 | Legg et al. | June 23, 1914 |
| 1,109,144 | Perkins | Sept. 1, 1914 |
| 1,372,172 | Larsen | Mar. 22, 1921 |
| 1,466,639 | Browne | Aug. 28, 1923 |
| 2,129,847 | Knodel | Sept. 13, 1938 |
| 2,225,058 | Langhaus | Dec. 17, 1940 |
| 2,256,422 | Brayer | Sept. 16, 1941 |
| 2,626,133 | Reed | Jan. 20, 1953 |
| 2,662,384 | Morrison et al. | Dec. 15, 1953 |
| 2,684,267 | Madsen | July 20, 1954 |